United States Patent [19]

Tokunaga

[11] Patent Number: 4,577,714

[45] Date of Patent: Mar. 25, 1986

[54] POWER TRANSMISSION ARRANGEMENT FOR A HYDROSTATICALLY DRIVEN VEHICLE

[75] Inventor: Noriyasu Tokunaga, Komatsu, Japan

[73] Assignee: Kabushiki Kaisha Komatsu Seisakusho, Tokyo, Japan

[21] Appl. No.: 563,343

[22] Filed: Dec. 20, 1983

[51] Int. Cl.$^4$ ............................................. B60K 17/00
[52] U.S. Cl. ................................. 180/70.1; 180/308
[58] Field of Search ..................... 180/70.1, 305, 308

[56] References Cited

U.S. PATENT DOCUMENTS

| | | | |
|---|---|---|---|
| 2,446,242 | 8/1948 | Orshansky, Jr. | 180/308 |
| 2,708,800 | 5/1955 | Logus | 180/305 |
| 3,085,643 | 4/1963 | Schwartz et al. | 180/70.1 |

FOREIGN PATENT DOCUMENTS 1133019  3/1957  France ................. 180/308

Primary Examiner—Joseph F. Peters, Jr.
Assistant Examiner—Kenneth R. Rice
Attorney, Agent, or Firm—Armstrong, Nikaido, Marmelstein & Kubovcik

[57] ABSTRACT

A power transmission arrangement for a hydrostatically driven vehicle including an engine mounted on a rear section of the vehicle body and a power distributor mounted on a front section of the vehicle body. The power distributor is operatively connected to the engine through a power transmission shaft and has at least two power outputs. A pair of pump and motor units are mounted on both sides of the vehicle body relative to the transmission shaft. Each pump and motor unit constitutes a hydrostatic transmission in which a motor is connected with a pump in a closed loop and driven thereby. Each pump and motor unit is connected with the power output of the power distributor and driven thereby. An output of each pump and motor unit is connected to a final drive of the vehicle.

1 Claim, 4 Drawing Figures

POWER TRANSMISSION ARRANGEMENT FOR A HYDROSTATICALLY DRIVEN VEHICLE

BACKGROUND OF THE INVENTION

This invention relates to a power transmission arrangement for use in a hydrostatically driven vehicle wherein the motive power developed by an engine is distributed into a plurality of groups and then transmitted to pump and motor units, characterized in that a power distribution apparatus is mounted on the opposite side of the engine, with the pump and motor units interposed therebetween.

There has so far been employed a power transmission system for use in hydrostatically driven vehicles wherein the output of the engine is transmitted through a damper to a power distribution apparatus where the power output is distributed into a plurality of groups so as to drive two sets of hydraulic pumps mounted on the power distribution apparatus, and the fluid under pressure delivered from the hydraulic pumps, respectively, is supplied through a high pressure piping into hydraulic motors serving as prime movers for the left and right running gears, said hydraulic motors serving to rotate or drive sprockets through final reduction gears.

The power transmission system of such a construction has, however, been disadvantageous in that, since the power distribution apparatus is located just behind the engine and hydraulic pumps are mounted to the power distribution apparatus, in case of effecting maintenance and repairs of the power distribution apparatus, it must be removed together with hydraulic pumps, and so servicing of it cannot be made easily, and also since the hydraulic pump is connected with the hydraulic motor by a high pressure piping, troubles due to damages of the high pressure piping tend to occur.

SUMMARY OF THE INVENTION

It is therefore an object of the present invention to provide a power transmission arrangement for a hydrostatically driven vehicle which mitigates the above noted problems.

Another object of the present invention is to provide a power transmission arrangement for a hydrostatically driven vehicle which allows an easy access to maintenance services.

In accordance with an aspect of the present invention, there is provided a power transmission arrangement for a hydrostatically driven vehicle having a vehicle body and a pair of endless tracks each mounted on each side of the vehicle body, comprising: a prime mover mounted on a rear section of the vehicle body; a power transmission shaft connected to said prime mover; power distributor means mounted on a front section of the vehicle body, said power distributor means having an power input connectible to said power transmission shaft and at least two power outputs; a pair of pump and motor units each unit being mounted on either side of the vehicle body relative to said power transmission shaft and forming a hydrostatic transmission, each unit having a power input connectible to the power output of said power distributor means and a power output; and a pair of final drive means for driving said endless tracks, each of said final drive means being connectible to the power output of said pump and motor unit.

The above and other objects, features and advantages of the present invention will be readily apparent from the following description taken in conjunction with the accompanying drawings.

DESCRIPTION OF THE PREFERRED EMBODIMENTS

Figure 1:
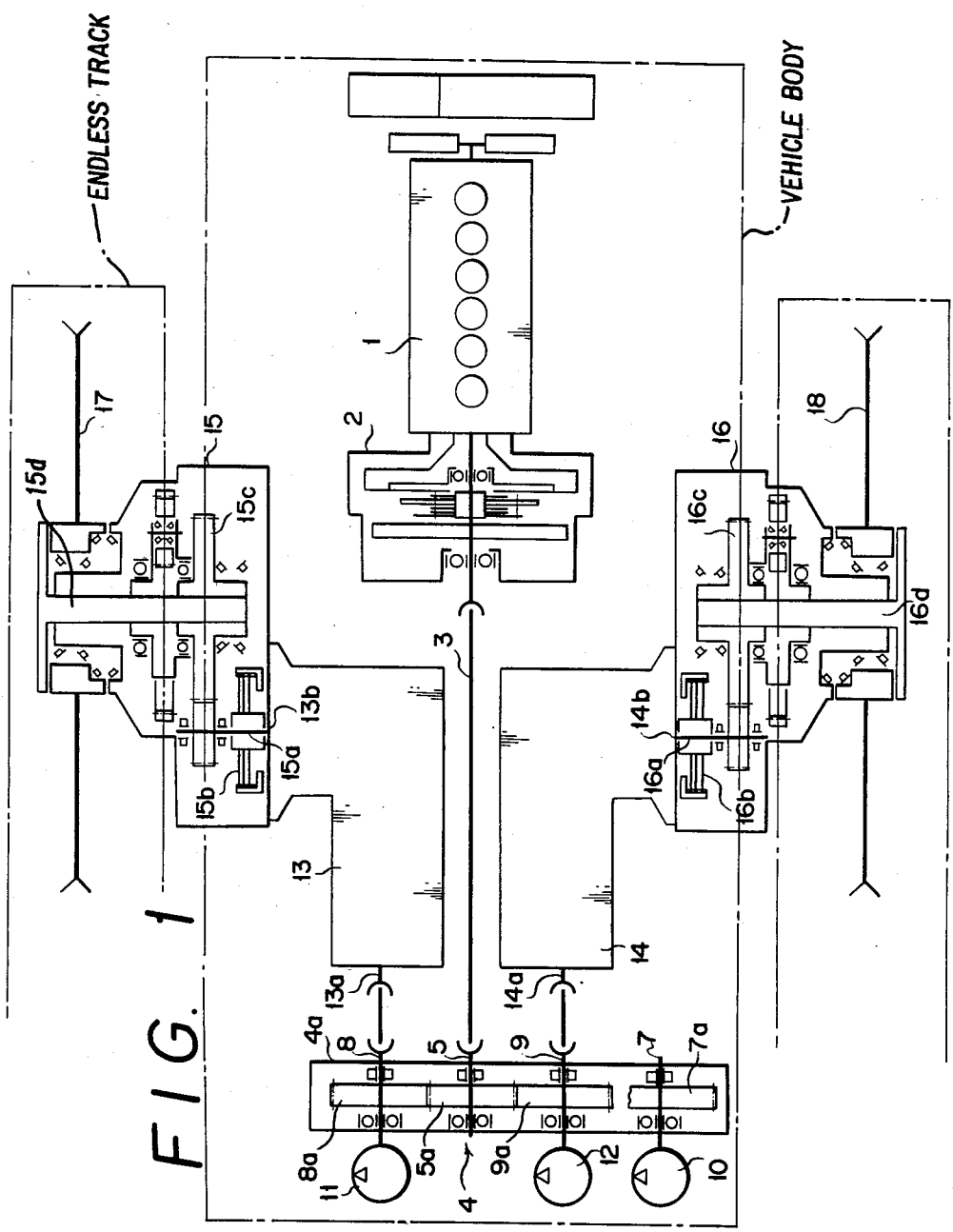
FIG. 1 is a diagrammatic representation of a power transmission arrangement according to the present invention.
Figure 2:
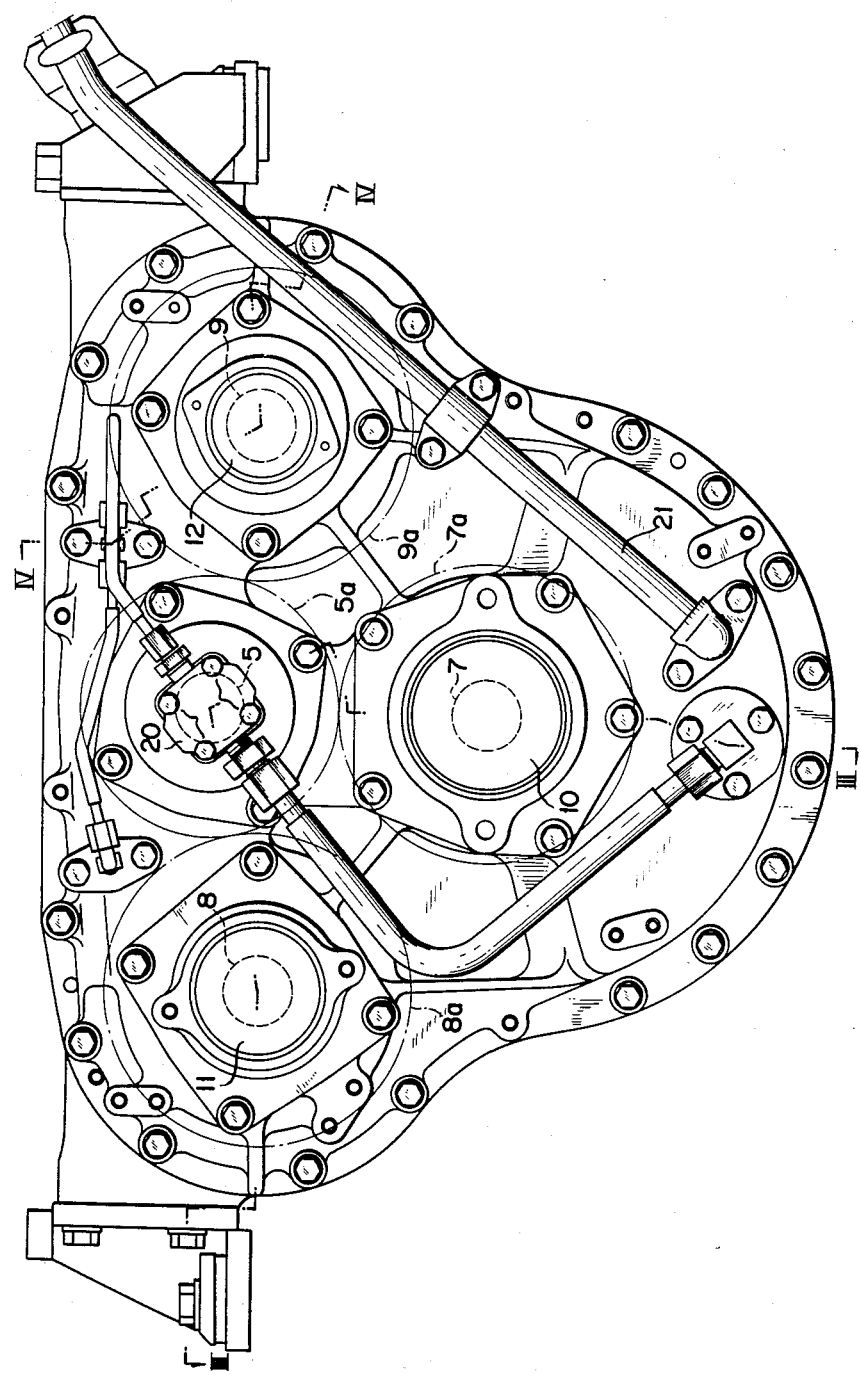
FIG. 2 is a front elevational view of a power distributor employed in the present invention.
Figure 3:
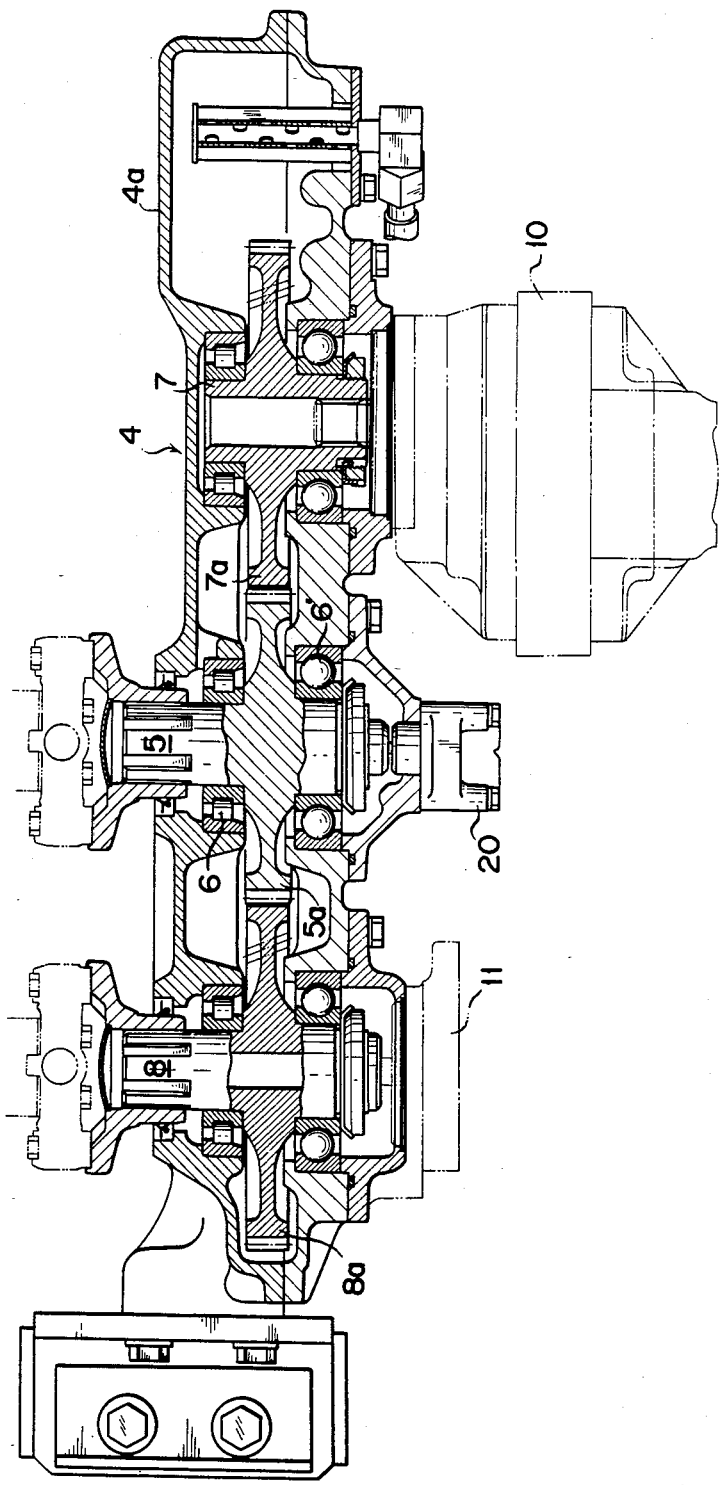
FIG. 3 is a cross-sectional view along the line III—III of FIG. 2.
Figure 4:
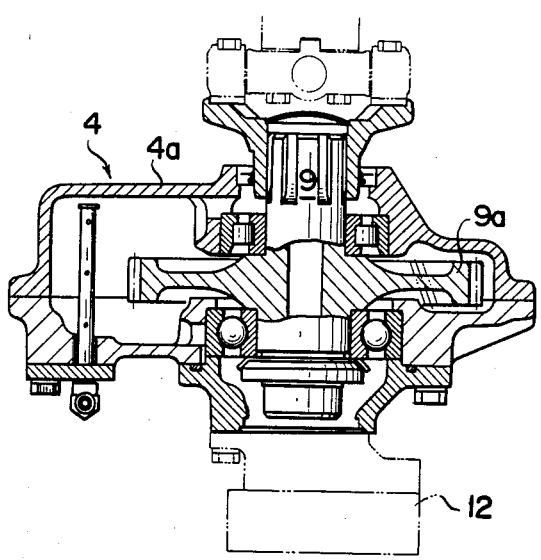
FIG. 4 is a cross-sectional view along the line IV—IV of FIG. 2.

The present invention will now be described in detail below by way of example only with reference to the accompanying drawings. In the drawings, reference numeral 1 denotes an engine mounted on the rear part of a hydrostatically driven vehicle body, the outline of which is indicated by dash and dot lines. The output of the engine 1 is transmitted to an input shaft 5 of a power distribution apparatus 4 mounted on the front part of the vehicle body through a damper 2 and a power transmission shaft 3. The input shaft 5 of the power distribution apparatus 4 is rotatably supported in bearings 6 and 6' disposed in the central, upper part of a casing 4a. The input shaft 5 has a gear 5a fitted thereto and which meshes with three sets of gears 7a, 8a and 9a. Out of the gears 7a to 9a, the gear 7a is fixedly secured to a shaft 7 located under the input shaft 5, one end of the shaft 7 being connected to a pump 10 for an implement mounted on the outside of the casing 4a. Further, on the opposite sides of the input shaft 5, gears 8a and 9a are fixedly secured to output shafts 8 and 9, respectively. One end of the output shaft 8 is connected to a charge pump 11 mounted on the outside of the casing 4a, whilst one end of the output shaft 9 is connected to a servo pump 12 mounted also on the outside of the casing 4a. The other ends of the output shafts 8, 9 project from the casing 4a towards the engine 1 and are connected to input shafts 13a and 14a of pump and motor units 13 and 14 located, respectively, on the opposite sides of the power transmission shaft 3. The pump and motor units 13 and 14 each comprise an integrated assembly of a hydraulic pump and a hydraulic motor and are independently disposed on the left and right sides of the vehicle. These pump and motor units 13 and 14 have output shafts 13b and 14b, respectively, which are connected to input shafts 15a and 16a of final reduction gears 15 and 16. The final reduction gears 15 and 16 each comprise brakes 15b and 16b mounted on the input shafts 15a and 16a, respectively, and reduction gear groups 15c and 16c. The arrangement is made such that the motive power which is reduced in speed by the reduction gear groups 15c and 16c, respectively, are transmitted through output shafts 15d and 16d to sprockets 17 and 18 serving to rotate the left and right endless tracks, the outline of which is indicated in FIG. 1 by dash and dot lines, to thereby drive the crawler vehicle.

Further, reference numeral 20 denotes a lubricating oil pump connected to the input shaft 5 of the power distribution apparatus 4 and arranged to lubricate the gears and bearings housed in the casing 4a. Further, reference numeral 21 denotes an oil detection pipe adapted to detect the quantity of lubricating oil.

As described in detail hereinabove, according to the present invention, the power output developed by the engine 1 is transmitted through the power transmission shaft 3, with the pump and motor units 13 and 14 located on both sides thereof, to the power distribution apparatus 4 and then distributed thereby into a plurality of groups so as to drive the pump and motor units 13 and 14 connected to the output shafts 8 and 9 of the power distributor 4. Therefore, in case of effecting maintenance and repairs of the power distribution apparatus 4, the power distributor 4 can be removed readily as a unit only by disconnecting the input shaft 5 from the power transmission shaft 3 and also disconnecting the output shafts 8 and 9 from the pump and motor units 13 and 14 so that servicing of the power distributor 4 can be made for easier than the connectional system. Furthermore, since the construction wherein the pump and motor units are driven directly by the motive power distributed by the power distributor 4 is employed, the need for providing a high pressure piping connecting the pump and the motor required in the conventional system can be eliminated, and therefore possible troubles due to damages of the high pressure piping can also be eliminated thereby enhancing reliability of the power distribution system.

It is to be understood that the foregoing description is merely illustrative of a preferred embodiment of the invention, and that the invention is not to be limited thereto, but is to be determined by the appended claims.

What is claimed is:

1. A power transmission arrangement for a hydrostatically driven vehicle having a vehicle body and a pair of endless tracks each mounted on each side of the vehicle body comprising:

a prime mover mounted at the rear of the vehicle;

a power transmission shaft connected to said prime mover;

power distributor means mounted on a front section of the vehicle body, said power distributor means having a power input connectible to said power transmission shaft and at least two power outputs;

a pair of pump and motor units each unit being mounted on either side of the vehicle body relative to said power transmission shaft, intermediate said prime mover and said power distributor means, and forming a hydrostatic transmission, each unit having a power input connectible to the power output of said power distributor means and a power output; and a pair of final drive means for driving said endless tracks, each of said final drive means being connectible to a power output of said pump and motor unit.

* * * * *